(12) United States Patent
van Stiphout

(10) Patent No.: US 9,405,090 B2
(45) Date of Patent: Aug. 2, 2016

(54) ADJUSTING INSTRUMENT FOR A MIRROR OF A VEHICLE

(71) Applicant: MCi (Mirror Controls International) Netherlands B.V., Woerden (NL)

(72) Inventor: Paulus Gerardus Maria van Stiphout, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 0 days.

(21) Appl. No.: 14/413,269

(22) PCT Filed: Jul. 9, 2013

(86) PCT No.: PCT/NL2013/050517
§ 371 (c)(1),
(2) Date: Jan. 7, 2015

(87) PCT Pub. No.: WO2014/011037
PCT Pub. Date: Jan. 16, 2014

(65) Prior Publication Data
US 2015/0160431 A1    Jun. 11, 2015

(30) Foreign Application Priority Data

Jul. 9, 2012    (NL) .................................... 2009160

(51) Int. Cl.
*B60R 1/06* (2006.01)
*G02B 7/182* (2006.01)
(Continued)

(52) U.S. Cl.
CPC .............. *G02B 7/1822* (2013.01); *B60R 1/066* (2013.01); *B60R 1/072* (2013.01); *F16M 11/123* (2013.01);
(Continued)

(58) Field of Classification Search
CPC .......... B60R 1/06; B60R 1/04; B60R 1/0605; B60R 1/072; B60R 1/066; A47G 1/24; A47G 1/16; A47G 1/166; F16M 11/12; G02B 7/18; G02B 7/182; G02B 7/1821
USPC ............... 248/487, 476, 478, 475.1; 359/871, 359/872, 876
See application file for complete search history.

(56) References Cited

U.S. PATENT DOCUMENTS 4,497,465 A *   2/1985   Yeakley et al. ............... 248/466
4,585,200 A     4/1986   Fisher
(Continued)

FOREIGN PATENT DOCUMENTS

CN     102053324       5/2011
CN     102458924 A     5/2012
(Continued)

OTHER PUBLICATIONS
International Search Report dated Oct. 9, 2013 from PCT/NL2013/050517.
(Continued)

*Primary Examiner* — Nkeisha Smith
(74) *Attorney, Agent, or Firm* — Swanson & Bratschun, L.L.C.

(57) ABSTRACT

Adjusting instrument for a mirror, comprising: a first part 2, a second part 3, wherein the first and second parts 2,3 are pivotable relative to each other, wherein the first part 2 is bearing-mounted via a first bearing 4 about a first pivoting axis 6, and wherein the first part 2 together with the first bearing 4 is bearing-mounted directly or indirectly via a second bearing 5 to the second part 3 about a second pivoting axis 7, which is substantially transverse to the first pivoting axis 6, wherein the first bearing comprises a bar spring 8, which bar spring 8 is biased in a bias direction V+ which is substantially transverse to an adjustment plane Vs formed by the first and second pivoting axes 6,7, which bar spring 8 provides that the two parts 2,3 are pressed against each other under bias substantially transversely to the adjustment plane Vs.

10 Claims, 4 Drawing Sheets

(51) Int. Cl.
  *B60R 1/066* (2006.01)
  *B60R 1/072* (2006.01)
  *F16M 11/12* (2006.01)
  *G02B 27/62* (2006.01)
  *F16M 13/02* (2006.01)

(52) U.S. Cl.
  CPC ........... *F16M 11/126* (2013.01); *F16M 13/022* (2013.01); *G02B 7/1824* (2013.01); *G02B 27/62* (2013.01)

(56) References Cited

U.S. PATENT DOCUMENTS

| | | | | |
|---|---|---|---|---|
| 4,973,145 | A * | 11/1990 | Kirkwood et al. | 359/872 |
| 4,973,820 | A | 11/1990 | Mittlehaeuser | |
| 5,196,965 | A | 3/1993 | Lang | |
| 5,315,890 | A * | 5/1994 | Long | 74/110 |
| 5,529,277 | A * | 6/1996 | Ostaszewski | 248/603 |
| 5,659,423 | A | 8/1997 | Schierbeek | |
| 6,474,821 | B2 * | 11/2002 | Schieweck et al. | 359/877 |
| 6,565,221 | B2 * | 5/2003 | Guttenberger et al. | 359/877 |
| 7,188,831 | B2 * | 3/2007 | Coppoolse | 267/160 |
| 8,016,438 | B2 * | 9/2011 | Meyer et al. | 359/872 |
| 2002/0171906 | A1 | 11/2002 | Busscher | |
| 2003/0179475 | A1 * | 9/2003 | Brouwer et al. | 359/871 |

FOREIGN PATENT DOCUMENTS

| | | |
|---|---|---|
| DE | 23 08 272 | 9/1974 |
| DE | 2627918 | 12/1977 |
| EP | 2 208 641 | 7/2010 |
| EP | 2 256 397 | 12/2010 |
| JP | 58 85546 | 6/1983 |
| JP | 8 104173 | 4/1996 |

OTHER PUBLICATIONS

International Search Report from PCT/NL2014/050313 dated Sep. 3, 2014.

Office Action and International Search Report from PCT/CN2013/800468034 dated Nov. 23, 2015 with English translation.

Office Action for Application Number: 2015-521567 dated Apr. 25, 2016, English translation only.

* cited by examiner

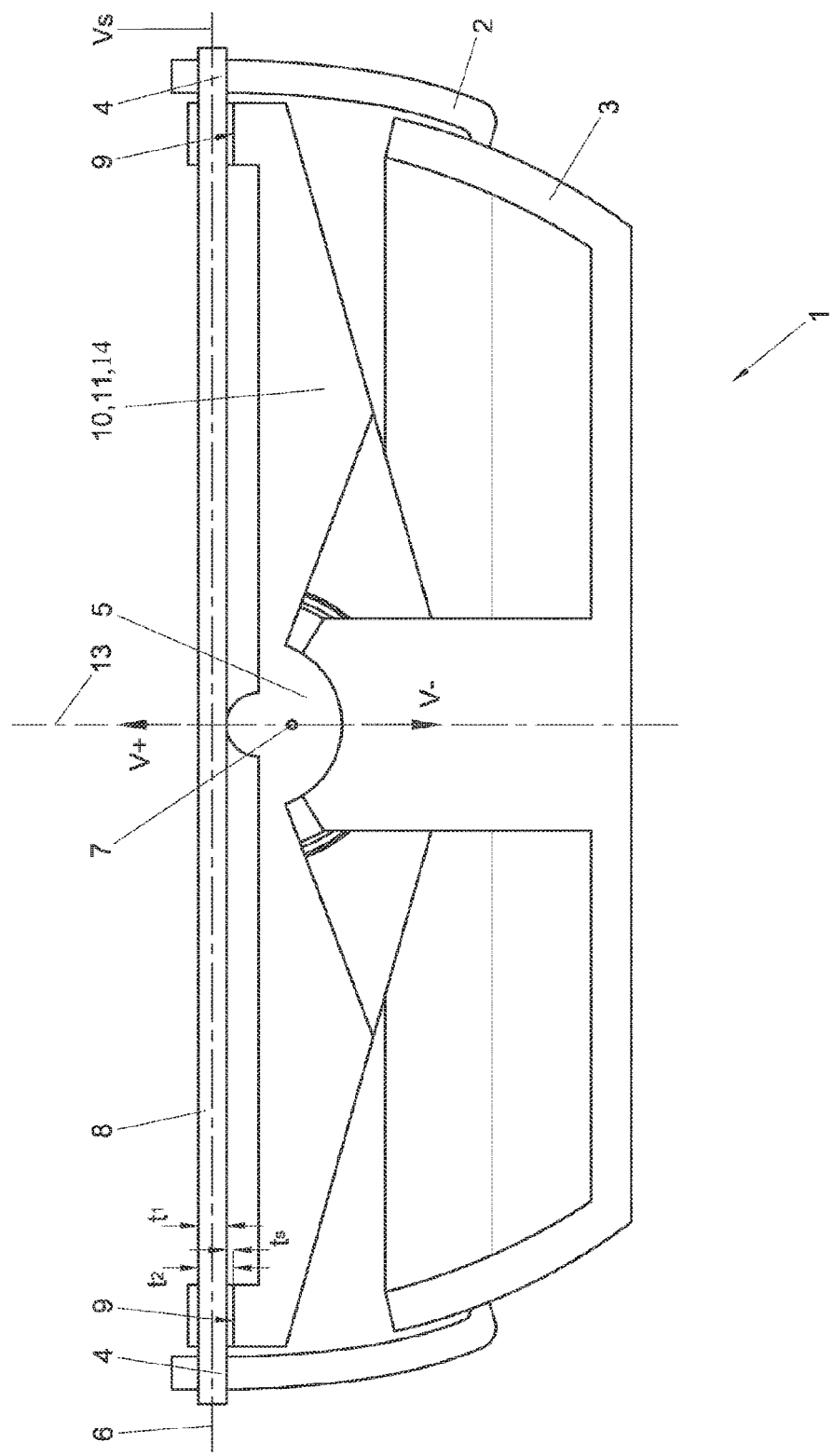

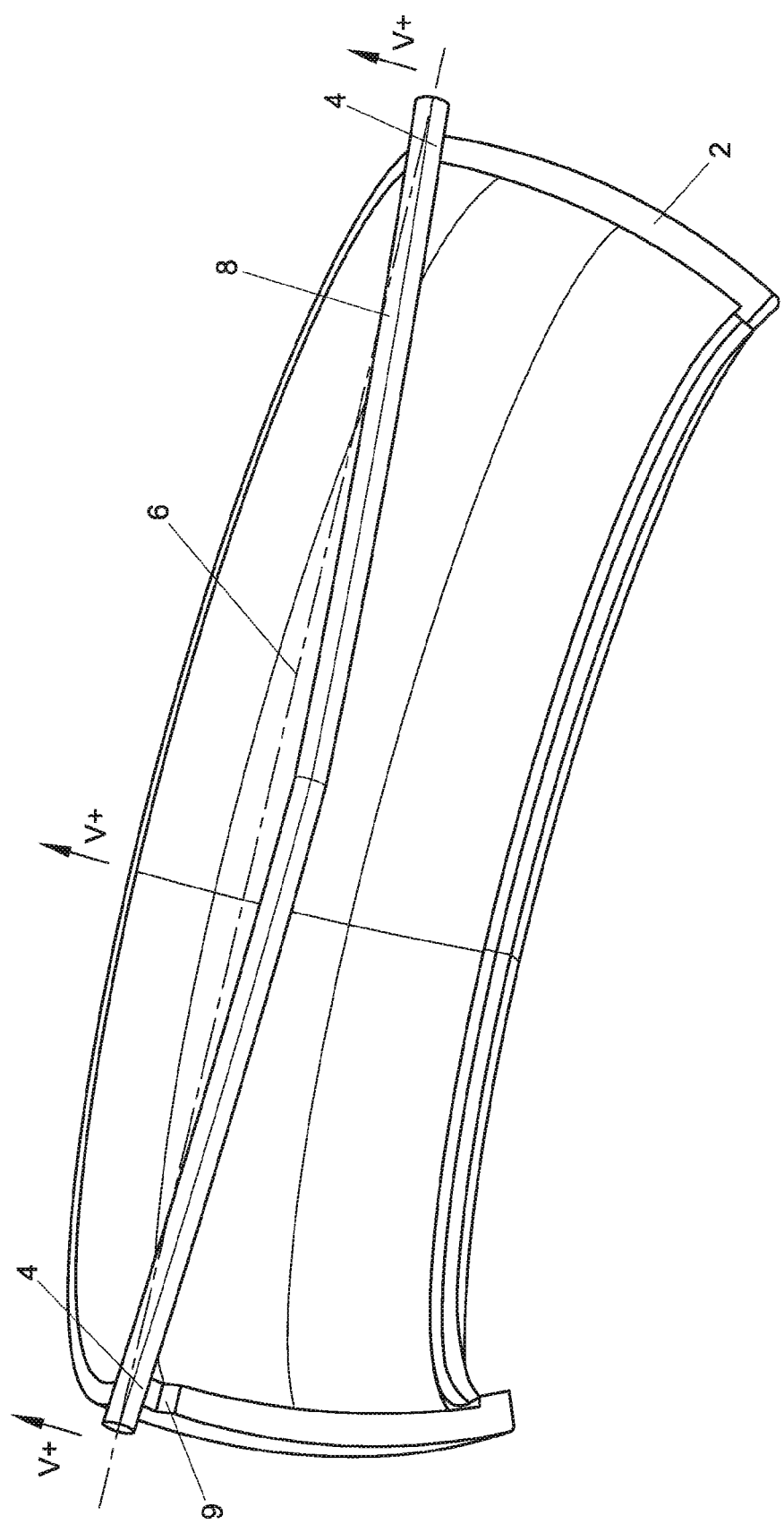

ADJUSTING INSTRUMENT FOR A MIRROR OF A VEHICLE

RELATED APPLICATIONS

This application is a 35 U.S.C. §371 national phase application of PCT/NL2013/050517 (WO 2014/011037), filed on Jul. 9, 2013, entitled "Adjusting Instrument", which application claims priority to Netherlands Application No. 2009160, filed Jul. 9, 2012, which is incorporated herein by reference in its entirety.

The invention relates to an adjusting instrument for a mirror.

Such an adjusting instrument is generally known and comprises a holder for holding a mirror which is adjustably connected with a lower shell. In such adjusting instruments, there is provided a biased skirt integrally injection molded with a holder for, for instance, holding the mirror, which skirt cooperates with the inner/outer surface of a lower shell. The skirts are so designed as to provide a certain pretension between lower shell and holder.

As a result of this pretension, upon adjustment of the holder relative to the lower shell, a slight friction, also called stability friction, occurs. The pretension and the friction resulting therefrom counteracts vibration of the holder relative to the lower shell. A vibrating adjusting instrument for, for instance, a mirror of an automobile can have a strongly adverse effect on visibility via the mirror.

It is a disadvantage, however, that in plastic parts that are under bias, such as the biased skirts mentioned, over time and under the influence of increased temperatures relaxation can occur. Through the relaxation the spring force of the plastic parts decreases, as a result of which vibration can occur in the adjusting instrument again.

An adjusting instrument described in EP 2 208 641 contemplates counteracting the above-mentioned disadvantages of the known type of adjusting instrument. Publication EP 2 208 641 describes a lower shell and a holder, for, for instance, a mirror glass, which are pivotable relative to each other. The holder is arranged via a kind of ball joint on a pillar extending from the lower shell. Along the pillar spiral springs are arranged to bias the ball joint.

A disadvantage of such an adjusting instrument described in EP 2 208 641 is that during manual adjustment the so-called sloppy feeling can occur, that is, during manual adjustment the holder has too much play transversely to the adjustment plane, i.e., in axial direction relative to the lower shell. An accurate manual adjustment of the holder relative to the lower shell is thereby rendered more difficult.

Another disadvantage of such an adjusting instrument is that it is relatively complex especially due to the number of parts. Because of this, the adjusting instrument is moreover of relatively large design.

The present invention contemplates the provision of an adjusting instrument which, while maintaining the advantages mentioned, counteracts the disadvantages mentioned.

To this end, the invention provides an adjusting instrument for a mirror, comprising a first part and a second part, wherein the first and second parts are pivotable relative to each other, wherein the first part is bearing-mounted via a first bearing about a first pivoting axis, and wherein the first part together with the first bearing is bearing-mounted directly or indirectly via a second bearing to the second part about a second pivoting axis, which is substantially transverse to the first pivoting axis, wherein the first bearing comprises a bar spring, which bar spring is biased in a bias direction which is substantially transverse to an adjustment plane formed by the first and second pivoting axes, which bar spring provides that the two parts are pressed against each other under bias substantially transversely to the adjustment plane formed by the two pivoting axes.

By providing a first bearing which comprises a bar spring, the adjusting instrument can be of simple and compact design. Further, such a bar spring can be relatively cost-effectively manufactured and assembled.

The first part can be an outgoing part for attachment to a mirror, in particular a holder for holding the mirror. The second part can be connected with the fixed world, and can be, in particular, a lower shell which, for instance, is attached to a mirror housing. It is noted that displacement of the first and second parts in the direction of the bias is limited by cooperating stops.

The adjusting instrument may furthermore be provided with a spring travel limiter, which limits the relative displacement of the first part relative to the second part against the direction of the bias. The bar spring thus has a uniformly defined stop in the positive spring travel direction. What can be achieved in this way is that in particular upon manual adjustment the 'sloppy feeling' is counteracted. Thus, the limiter may be an oversize hole through which the bar spring extends. The play that the limiter can allow between first and second part can be, for instance, 0.1-1.5 mm, in particular 0.5 mm.

In addition, with the use of a spring travel limiter, the maximum amount of deflection of the bar spring can be limited, thereby avoiding the bar spring becoming plastically deformed.

The adjusting instrument may furthermore be arranged such that the first bearing is supported on an intermediate part. This intermediate part may be, for instance, a cross piece. The intermediate part or cross piece can then be arranged between the first and the second part, and may be included pivotably about the second pivoting axis via the second bearing. Efficiently, the second bearing may be a part integral with the intermediate part or cross piece, but it may also be a discrete part.

Elegantly, the bar spring can coincide with the first pivoting axis. Moreover, in this way, at least one end of the bar part may be part of the first bearing, that is, pivoting of the first part relative to the second part takes place around this end of the spring. In this way, fewer parts are necessary, so that less relaxation may occur and the adjusting instrument can be simpler and cheaper to manufacture.

Furthermore, the adjusting instrument may be provided with a turning limiter against rotation of the first part relative to the second part about a third pivoting axis which is substantially transverse to the adjustment plane formed by the other two pivoting axes. The intermediate part or cross piece can serve as a turning limiter if it is so stiff in design that substantially no bending of intermediate part or cross piece occurs when a torsional or rotational force that is customary for an adjusting instrument is exerted on it. It is noted that when the first and second pivoting axes cross each other with an intermediate distance, the adjustment plane has a thickness that corresponds to the intermediate distance between the first and second pivoting axes. With intersecting pivoting axes this thickness is zero.

The first part of the adjusting instrument can be implemented as a part that comprises a ring. If an intermediate part or cross piece is used, this can substantially span the inner diameter of the ring. Thus, the ring can follow at least partly the surface of a sphere, that is, a sphere section.

The second part can then be at least partly spherically shaped, so that the shape of the first part can easily follow an outer and/or possibly the inner surface of the second part. Such cooperation of a spherical part in a cup-shaped part makes an adjustment of the first part relative to the second part easy, in particular if the first and second parts are pressed against each other under bias.

Furthermore, the first and second pivoting axes can cross each other substantially perpendicularly. This has as an advantage that mechanical adjustment by means of, for instance, an actuator or similar drive via, for instance, a gear/gear rack construction can be realized more easily.

It will be clear to one skilled in the art that the technical features of the adjusting instrument elucidated in the above paragraphs can be used to advantage in an adjusting instrument according to the main claim not only each alone, but also in every possible combination. Such combinations are herewith specifically disclosed in this description.

The invention will be elucidated in more detail on the basis of a non-limiting exemplary embodiment, which is represented in a drawing. In the drawing:

FIG. 3 shows a midsectional side view of an adjusting instrument according to a first embodiment of the invention;

FIG. 4 shows a perspective view of the first part, with the bar spring in untensioned condition.

It is noted that the drawing figures are merely schematic representations of exemplary embodiments of the invention. In the figures, like or corresponding parts are denoted with the same reference numerals.

For the purposes of this disclosure it is pointed out that all the technical features that are specifically described here may be susceptible of a functional generalization. Furthermore, it is pointed out that—as far as not explicitly indicated—such technical features can be seen separately from the context of the exemplary embodiment given, and furthermore can be seen separately from the technical features with which they cooperate in the context of the example.

Figure 1:
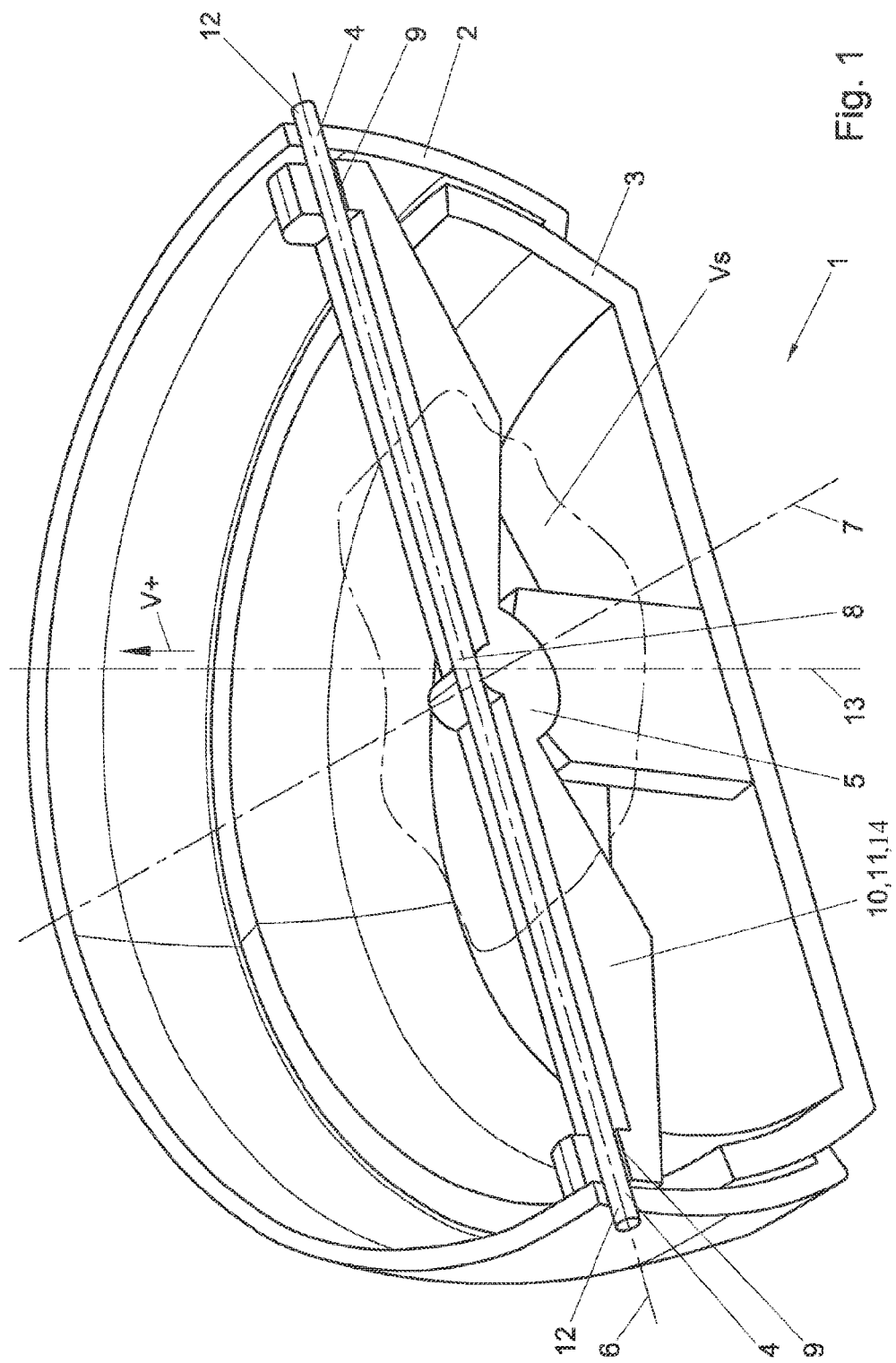
FIG. 1 shows a perspective midsectional view of an adjusting instrument according to a first embodiment of the invention.

FIG. 1 shows in a first embodiment of the invention an adjusting instrument 1 for a mirror, comprising a first part 2 and a second part 3. The first part 2 and second part 3 are mutually connected pivotably relative to each other. Thus, the first part 2 can be used as outgoing part, for instance for supporting a mirror glass, and the second part 3 may be connected with the fixed world, for instance, a lower shell in which an adjusting mechanism is accommodated. The first part 2 is bearing-mounted via a first bearing 4 about a first pivoting axis 6. The first bearing provision permits a movement of the first part 2 relative to the second part 3 about this first pivoting axis 6.

Furthermore, FIG. 1 shows that the first part 2 together with the first bearing 4 is bearing-mounted to the second part 3 via a second bearing 5 about a second pivoting axis 7. This is to say that the first part 2 and the first bearing 4 upon adjustment about the second pivoting axis 7 move jointly relative to the second part 3. Accordingly, the first part 2 is adjustable relative to the second part 3 at least via the two pivoting axes 6, 7 in at least two dimensions.

In this exemplary embodiment, the two pivoting axes 6, 7 cross each other substantially perpendicularly, but obviously the two pivoting axes 6, 7 can also cross each other at a different angle whereby adjustment of the first part 2 relative to the second part 3 is possible. However, if the adjusting instrument is provided with an actuator taking care of the movement and/or adjustment of the first part 2 relative to the second part 3, then, with a view to a uniform adjustment of the adjusting instrument 1 about the first as well as the second pivoting axis 6, 7, pivoting axes 6, 7 crossing each other perpendicularly are preferred. In a preferred embodiment the two pivoting axes 6, 7 cross each other at a relatively short mutual distance, or are even in one plane. The two pivoting axes 6, 7 together define the adjustment plane $V_s$.

Figure 2:
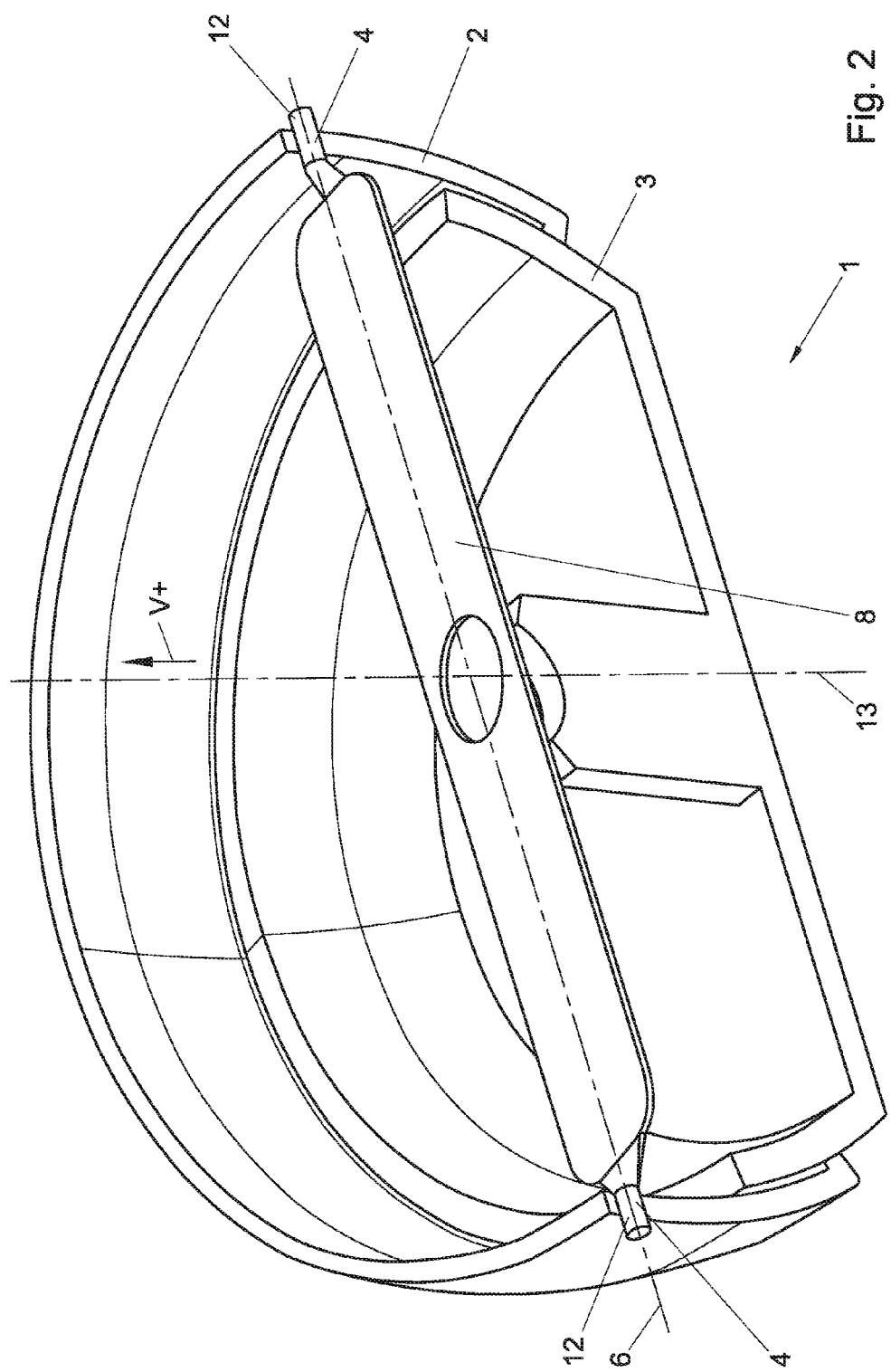
FIG. 2 shows a perspective schematic view of an adjusting instrument according to a second embodiment of the invention.

FIG. 4 shows the first part 2 with a bar spring 8 in an untensioned condition. The untensioned bar spring 8 has a precurved shape, so that when it is included in the adjustment device, it is biased substantially transversely to the adjustment plane $V_s$. Bar spring 8 should be understood to mean any spring that comprises at least a bar-shaped portion. The bar spring can have any cross section, but preferably has a flat or angular, non-round cross section as shown in FIG. 2. The advantage of such a bar spring 8 is that it is easy to lock against rotation about its own axis.

In another preferred embodiment, not shown, the bar spring 8 is provided with bent bend-sections to counteract rotation about its own axis.

In the embodiments of the invention shown in FIGS. 1 and 2, the first part is implemented as a ring and the second part 3 as an at least partly spherical tray. Preferably, both the ring and shell follow at least partly the surface of a sphere, so that adjustment of the first part 2 relative to the second part 3 in all directions is easily realized.

The first part 2 is held under spring action of bar spring 8 in a positive bias direction $V^+$ which is directed away from the second part 3 and is substantially perpendicular to the first and second pivoting axes 6, 7. The first and second parts 2, 3 are pressed apart under bias. The lower edge of the first part 2 cooperates with the upper edge of the second part 3 as a stop, so that the displacement in positive bias direction is limited. The slight friction arising between the first and second element 2, 3 due to the bias provides that vibrations of, for instance, a vehicle on which the adjusting instrument 1 is mounted are not transmitted, or less so, to the first part 2. It is noted here that while in the embodiments of the adjusting instrument according to the invention the ring is disposed around the tray and is urged outwardly relative to the tray by the bar spring 8, the adjusting instrument may equally be configured such that the ring is on the inside of the tray, so that the spring action of the bar spring 8 is now directed from the first part 2 to the second part 3.

Preferably, the displacement of the bar spring 8 in the negative bias direction is limited by a spring travel limiter 9, which provides that the bar spring 8 does not plastically deform. Furthermore, the spring travel limiter 9 also counteracts the sloppy feeling referred to above. FIG. 3 shows that the spring travel limiter 9 in this embodiment has an oversize opening having a cross section of $t^2$ for receiving a bar spring of diameter $t^1$. The difference $t^s$ between the two dimensions $t^1$ and $t^2$ reflects the length of spring travel of the bar spring 8 before it is limited. Values for is may be in the order of magnitude of 0.1 mm-1.5 mm. In this manner, provision can be made for adjustment of the adjusting instrument 1 being possible without giving rise to sloppy feeling and without the position of the first part 2 and the second part 3 relative to each other being overdetermined as a result of which the adjusting instrument 1 would stick.

Furthermore, the adjusting instrument 1 may be provided with an intermediate part 10. The purpose here served by the intermediate part 10 is for the first part 2 together with the first bearing 4 to be bearing-mounted indirectly via the second bearing 5 to the second part about a second pivoting axis 7. The intermediate part 10 can be implemented, for instance, as a cross piece 11, as shown in FIGS. 1 and 3. FIG. 2 shows an embodiment where no cross piece is present.

The intermediate part 10 or cross piece 11 can additionally serve as a turning limiter 14, which at least partly limits rotation of the first part 2 relative to the second part 3 about a third pivoting axis 13. The pivoting axis 13 is substantially perpendicular to the adjustment plane $V_s$ formed by the first and second pivoting axes 6, 7. However, such a turning limiter 14 may also be implemented (not shown) as supports or stops disposed along the bar spring 8 to counteract pivoting about the third pivoting axis 13.

In a preferred embodiment, for instance as shown in FIGS. 1 and 3, the first bearing 4 is supported on the intermediate part 10 or cross piece 11 if present. In this way, parts are saved and the adjusting instrument 1 can be simpler in design. In addition, preferably, the first pivoting axis coincides with the bar spring 8. This has as an advantage that the bar spring 8 can be part of the first bearing 4, thus allowing, furthermore, further parts to be omitted. By reducing parts, the relaxation effect on the number of plastic parts can be limited to a minimum, so that the life of the adjusting instrument 1 is augmented considerably.

The invention is not limited to the exemplary embodiment given here. Many variants of embodiments are possible.

Such variants will be clear to one skilled in the art and are understood to be within the scope of the invention as set out in the following claims.

The invention claimed is:

1. An adjusting instrument for a mirror of a vehicle, comprising:
    a first part
    a second part,
    wherein the first and second parts are pivotable relative to each other, wherein the first part is bearing-mounted via a first bearing about a first pivoting axis, and wherein the first part together with the first bearing is bearing-mounted directly or indirectly via a second bearing to the second part about a second pivoting axis which is substantially transverse to the first pivoting axis, and
    the first bearing comprises a bar spring, which bar spring is biased in a bias direction which is substantially transverse to an adjustment plane defined by the first and second pivoting axes, which bar spring provides that the first part and the second part are pressed against each other under bias substantially transversely to the adjustment plane and wherein the first part is adjustable relative to the second part via the two pivoting axes in at least two dimensions.

2. The adjusting instrument according to claim 1, wherein a spring travel limiter is provided, which limits a relative displacement of the first part with respect to the second part in at spring travel direction.

3. The adjusting instrument according to claim 1, wherein the first bearing is supported on an intermediate part.

4. The adjusting instrument according to claim 1, wherein the first bearing is supported on a cross piece.

5. The adjusting instrument according to claim 1, wherein the first pivoting axis coincides with the bar spring.

6. The adjusting instrument according to claim 1, wherein at least one end of the bar spring is part of the first bearing.

7. The adjusting instrument according to claim 1, wherein at least one turning limiter is provided against rotation of the first part relative to the second part about a third pivoting axis, which is substantially transverse to the first and second pivoting axes.

8. The adjusting instrument according to claim 1, wherein the first part comprises a ring.

9. The adjusting instrument according to claim 8, wherein the ring follows at least partly a surface of a sphere.

10. The adjusting instrument according to claim 1, wherein the second part is at least partly spherically shaped.

* * * * *